UNITED STATES PATENT OFFICE.

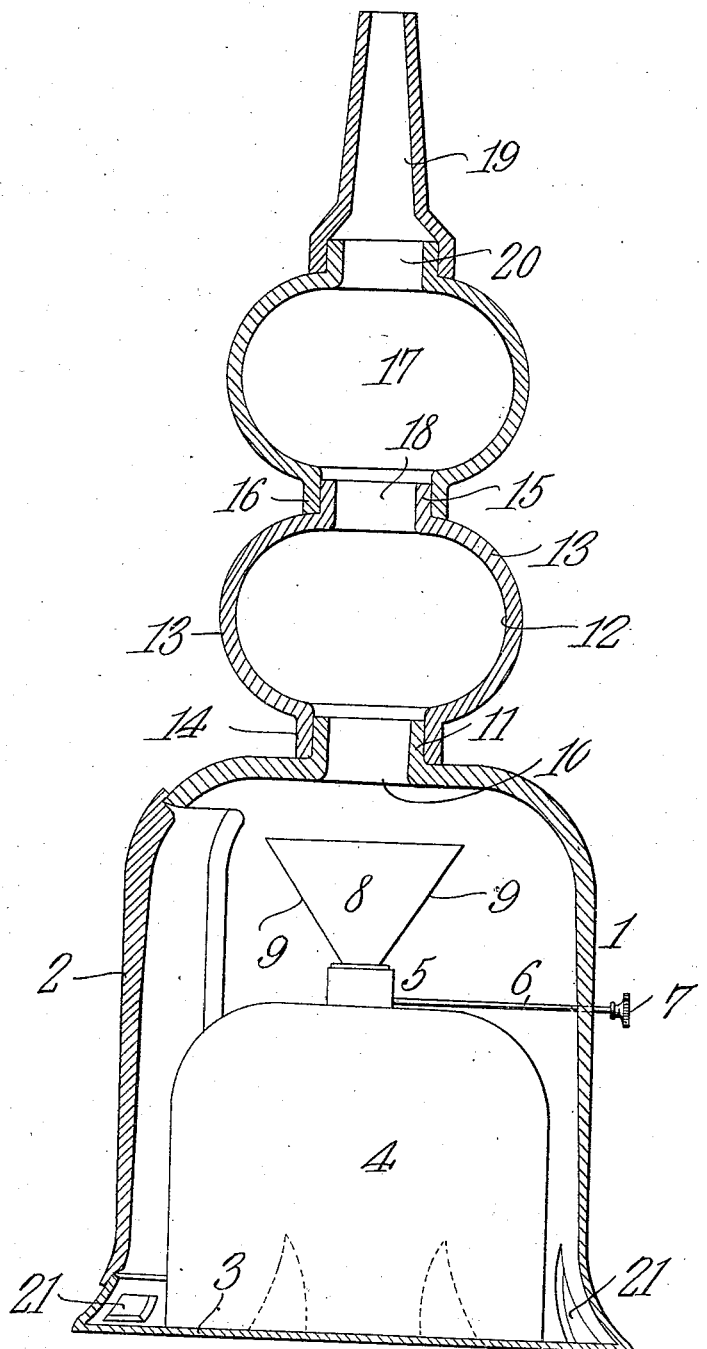

JAMES T. RAY, OF LONE OAK, TEXAS.

OIL-HEATER.

No. 879,672.     Specification of Letters Patent.     Patented Feb. 18, 1908.

Application filed April 13, 1907. Serial No. 368,126.

*To all whom it may concern:*

Be it known that I, JAMES T. RAY, a citizen of the United States, residing at Lone Oak, in the county of Hunt and State of Texas, have invented a new and useful Oil-Heater, of which the following is a specification.

This invention relates to a heating apparatus using oil as fuel, and comprises a hollow base in which the burner and oil tank are placed, while above are a plurality of heating chambers into which heat and the products of combustion pass through flues connecting the hollow base to the heating chambers and the latter to each other.

The object of the invention is to provide a cheap, simple and efficient apparatus for heating purposes which shall comprise few parts, be readily accessible, and easily assembled, or taken apart, for cleaning and other purposes.

In the accompanying drawing, which is a vertical sectional view of the invention, the numeral 1 indicates a hollow metal base of any desired shape and proportioned for the amount of heat to be radiated therefrom. A door 2 is hinged to the base 1 through which the burner and oil tank can be easily removed. The base 1 has preferably a bottom 3 on which the oil tank 4 is placed, a burner 5 projecting from the top of the tank, and having a wick adjuster 6 extending laterally through the wall of the base 1 and provided at the end with a thumb button 7. Rising from the burner 5 is a flame spreader 8 the sides 9 of which diverge from the burner 5 upwardly. The upper side of the base 1 is perforated for a flue 10 surrounded by a flange 11, through which flue, heat and the products of combustion pass out of the base.

Above the base 1 is a heating chamber 12, here shown as having semi-circular sides 13, but which may be of any suitable shape. Depending from the under side of the heating chamber 12 is a neck or flange 14 into which the flange 11 on the base enters when the parts are assembled. A flange or neck 15 on the top of the heating chamber is fitted in a similar flange 16 extending downwardly from a second heating chamber 17 which may have the same shape as the heating chamber 12, or be differently formed. The flue 18 formed by the necks 15, 16, provides a heat passage between the upper and lower heating chambers.

A draft cap 19 placed over a flanged outlet 20 on the heating chamber 17, permits the products of combustion to escape from the heating apparatus. Air to support combustion enters through suitable openings 21 in the base 1.

When the burner is lighted, the flame and heat are deflected by the spreader 8 to prevent their passing directly through the flue 10. The top of the base 1 first receives the heat which then passes through the successive flues and heating chambers to the cap 19. As the heat passes, it raises the temperature of the walls of the base and chambers, which in turn radiate the heat from their exterior surfaces.

I claim:—

A heating apparatus comprising a hollow metal base, its bottom, sides and top being integrally formed and having a door opening in the side, a door for closing said opening, draft openings near the bottom and an integral open neck projecting upwardly from the top, a plurality of hollow metal heating chambers axially disposed above the base with integral necks at their tops and bottoms to slidably connect with one another and with the base neck, a draft cap fitted to the neck of the highest heating chamber, and a removable heating apparatus within the base having a burner and a flame spreader to deflect the flame against the top and sides of said base for heating them, the flame then passing through the base neck into one or more heating chambers, air being supplied to said burner through the openings in the base.

In testimony that I claim the foregoing as my own, I have hereto affixed my signature in the presence of two witnesses.

JAMES T. RAY.

Witnesses:
    M. F. LITCHFIELD,
    J. F. DAVIS.